United States Patent
Therrien

(10) Patent No.: US 10,837,647 B2
(45) Date of Patent: Nov. 17, 2020

(54) BARBECUE AND FIREPLACE COMBINATION ASSEMBLY

(71) Applicant: Denis Therrien, Stoney Creek (CA)

(72) Inventor: Denis Therrien, Stoney Creek (CA)

(*) Notice: Subject to any disclaimer, the term of this patent is extended or adjusted under 35 U.S.C. 154(b) by 46 days.

(21) Appl. No.: 16/296,791

(22) Filed: Mar. 8, 2019

(65) Prior Publication Data
US 2020/0284434 A1    Sep. 10, 2020

(51) Int. Cl.
*F24B 1/182*    (2006.01)
*F24B 1/181*    (2006.01)

(52) U.S. Cl.
CPC ............ *F24B 1/182* (2013.01); *F24B 1/181* (2013.01)

(58) Field of Classification Search
CPC ... F24C 11/00; F24C 15/18; F24C 3/00; A47J 37/0713
USPC ...... 126/25 A, 25 AA, 25 B, 25 C, 25 R, 26, 126/27–29, 500, 506, 512
See application file for complete search history.

(56) References Cited

U.S. PATENT DOCUMENTS

| | | | |
|---|---|---|---|
| 3,174,473 A | 3/1965 | Swanstrom | |
| 6,142,143 A | 11/2000 | Martin | |
| 6,311,687 B1* | 11/2001 | Aidelsburger | F24H 7/0258 |
| | | | 126/400 |
| 6,913,011 B1 | 7/2005 | Snider | |
| 9,074,775 B2 | 7/2015 | McCary, Sr. | |
| 9,316,401 B1* | 4/2016 | Guste | F24C 15/18 |
| 2009/0165774 A1* | 7/2009 | Johnston | A47J 37/0682 |
| | | | 126/25 R |
| 2010/0288263 A1 | 11/2010 | Sykes | |
| 2011/0067053 A1* | 3/2011 | Tripp, II | A47J 37/0704 |
| | | | 725/35 |

* cited by examiner

*Primary Examiner* — Vivek K Shirsat

(57) ABSTRACT

A barbecue and fireplace combination assembly for grilling, heating, and entertainment includes a housing that defines an interior space. A barbecue, which is fuel gas powered, is mounted to a top of the housing. Fuel gas that flows to the barbecue is configured to be ignited by a user to barbecue a food item. A fireplace, which also is fuel gas powered, is coupled to the housing and is positioned in the interior space. Fuel gas that flows to the fireplace is configured to be lighted by the user to heat an area proximate to the fireplace. An opening is positioned in a front of the housing. A window is coupled to the front of housing so that the window substantially sealably closes the opening. The window is configured to allow visual enjoyment of the fireplace.

18 Claims, 5 Drawing Sheets

US 10,837,647 B2

BARBECUE AND FIREPLACE COMBINATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to barbecue assemblies and more particularly pertains to a new barbecue assembly for grilling, heating, and entertainment.

BRIEF SUMMARY OF THE INVENTION

An embodiment of the disclosure meets the needs presented above by generally comprising a housing that defines an interior space. A barbecue, which is fuel gas powered, is mounted to a top of the housing. Fuel gas that flows to the barbecue is configured to be ignited by a user to barbecue a food item. A fireplace, which also is fuel gas powered, is coupled to the housing and is positioned in the interior space. Fuel gas that flows to the fireplace is configured to be lighted by the user to heat an area proximate to the fireplace. An opening is positioned in a front of the housing. A window is coupled to the front of housing so that the window substantially sealably closes the opening. The window is configured to allow visual enjoyment of the fireplace.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
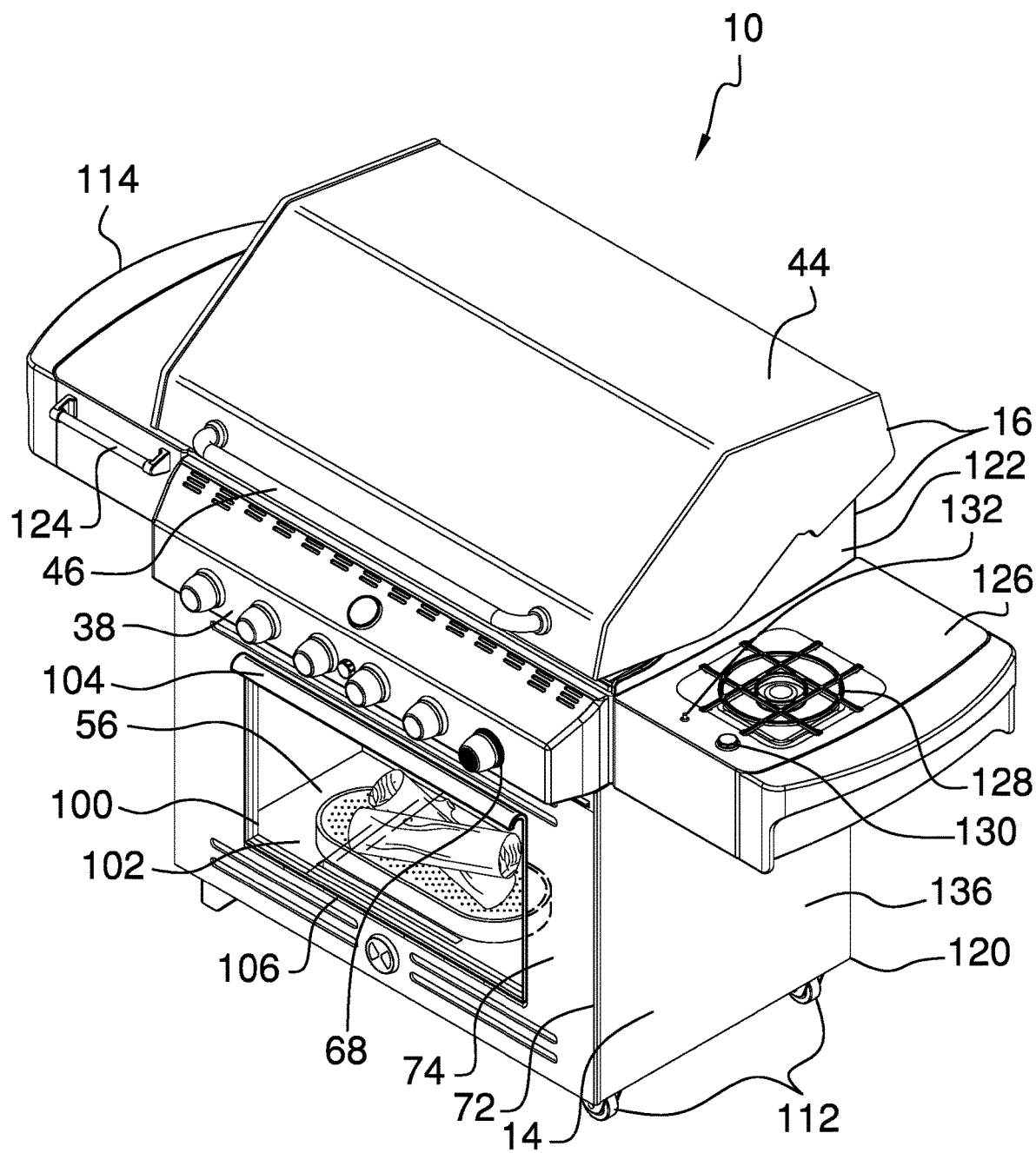
FIG. 1 is an isometric perspective view of a barbecue and fireplace combination assembly according to an embodiment of the disclosure.

With reference now to the drawings, and in particular to FIGS. 1 through 5 thereof, a new barbecue assembly embodying the principles and concepts of an embodiment of the disclosure and generally designated by the reference numeral 10 will be described.

As best illustrated in FIGS. 1 through 5, the barbecue and fireplace combination assembly 10 generally comprises a housing 12 that defines an interior space 14. A barbecue 16, which is fuel gas powered, is mounted to a top 18 of the housing 12. Fuel gas that flows to the barbecue 16 is configured to be ignited by a user to barbecue a food item.

The barbecue 16 comprises a grill box 20 that has an upper surface 22, which is open. The grill box 20 comprises a pair of side panels 24, a back panel 26, and a front panel 28. Each side panel 24 is coupled to and extends perpendicularly from a respective opposing edge 30 of the top 18. The back panel 26 is coupled to and extends from a back edge 32 of the top 18. The back panel 26 is coupled to and extends between the side panels 24. The front panel 28 is coupled to and extends from a front edge 34 of the top 18. The front panel 28 is coupled to and extends between the side panels 24. The front panel 28 is dimensionally shorter than the back panel 26 so that the side panels 24 taper from the back panel 26 to the front panel 28.

A plurality of barbecue burners 36 is coupled to and is positioned in the grill box 20. The plurality of barbecue burners 36 are selectively couplable to a source of fuel gas. A control panel 38 is coupled to and extends from a forward face 40 of the grill box 20. The control panel 38 comprises a plurality of burner knobs 42. Each burner knob 42 is operationally coupled to a respective barbecue burner 36 and the source of fuel gas. The burner knob 42 is configured to be selectively turned to control a flow of fuel gas to the respective barbecue burner 36.

A lid 44 that is pivotally coupled to the grill box 20 is positioned to selectively close the grill box 20. A lid handle 46 that is coupled to the lid 44 is configured to be grasped in a hand of the user to pivot the lid 44 relative to the grill box 20 to open the grill box 20. A thermometer 48 that is coupled to the control panel 38 is configured to measure a temperature within the grill box 20 and to display a temperature reading to the user.

Figure 3:
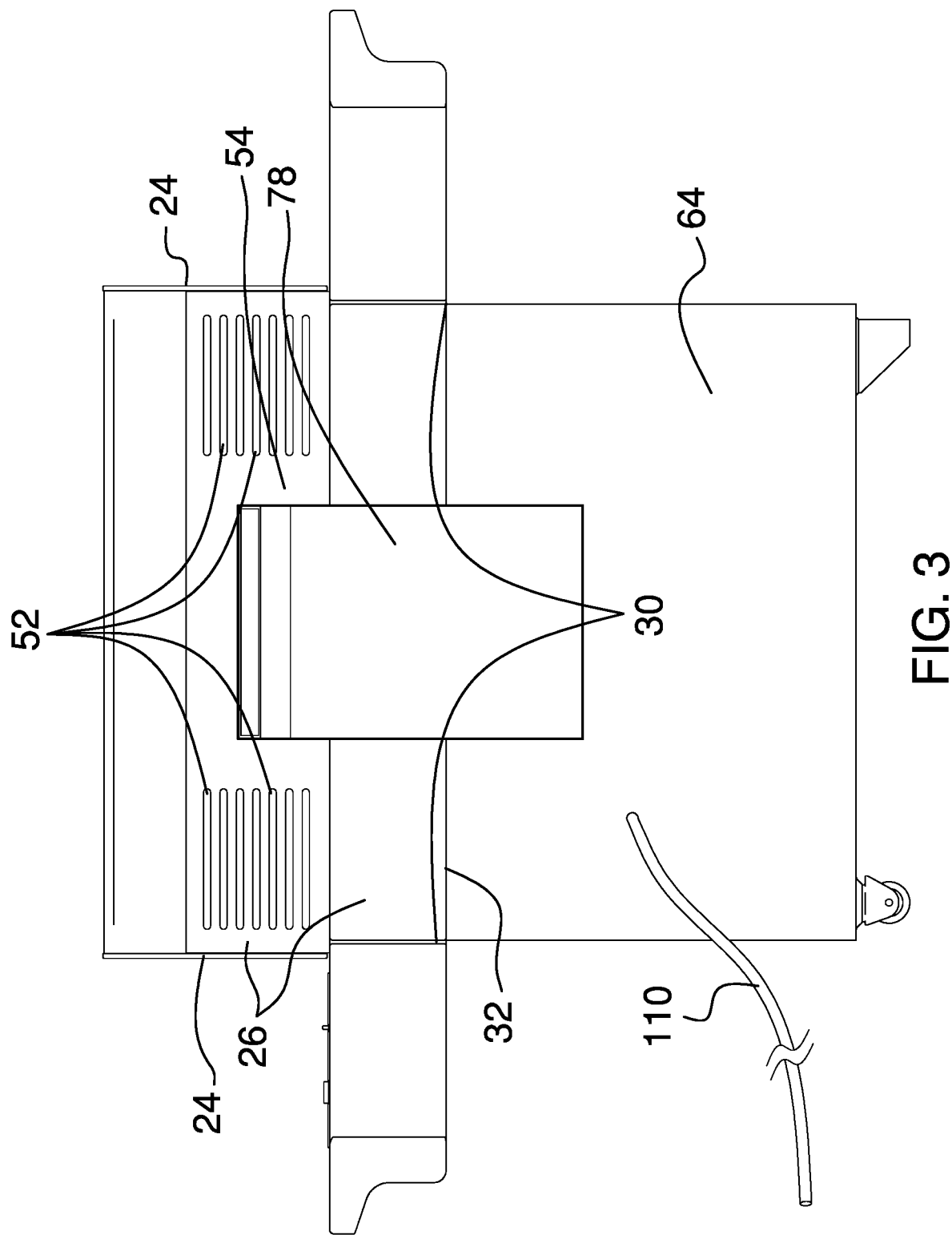
FIG. 3 is a back view of an embodiment of the disclosure.
Figure 4:
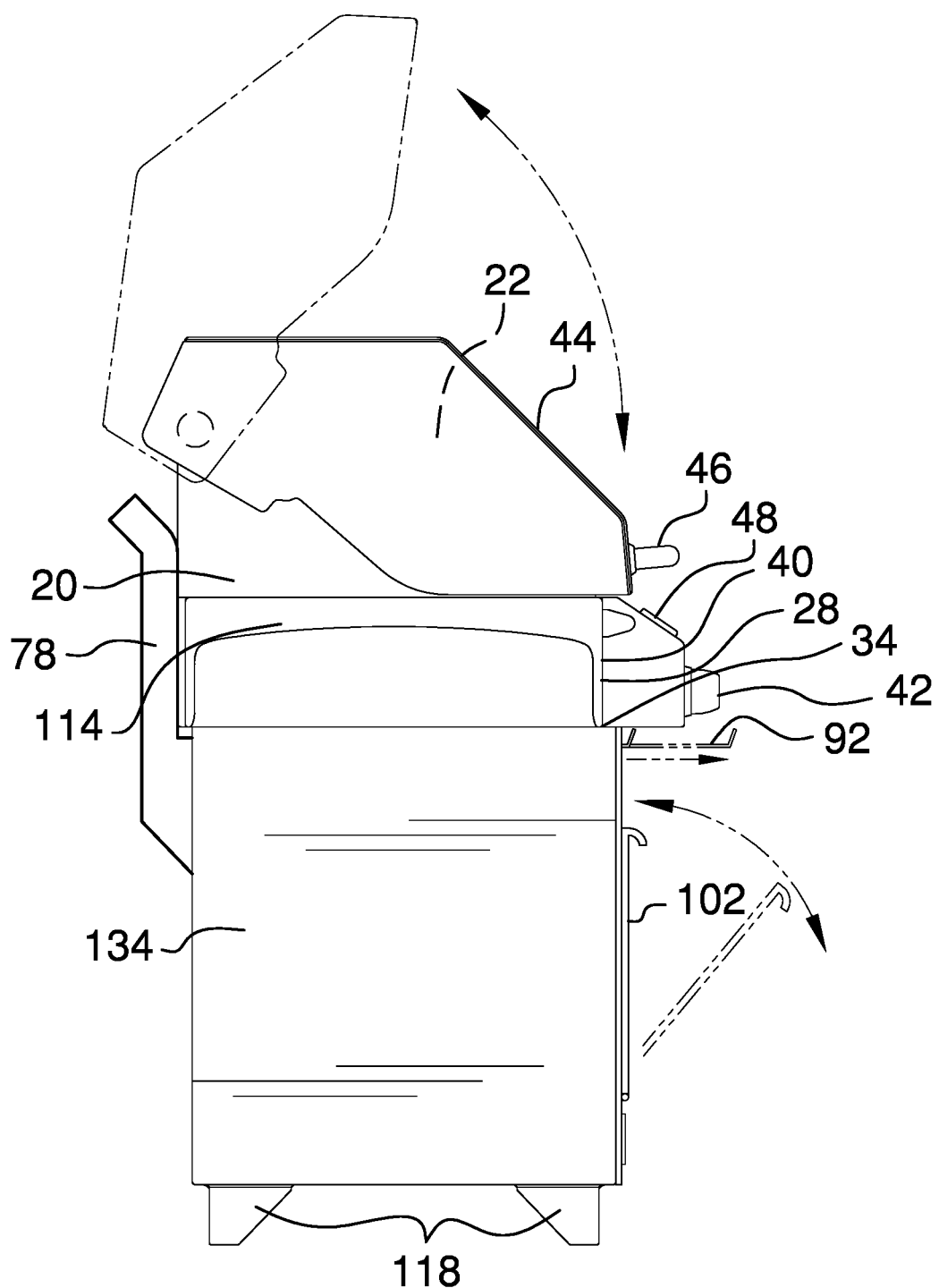
FIG. 4 is a side view of an embodiment of the disclosure.
Figure 5:
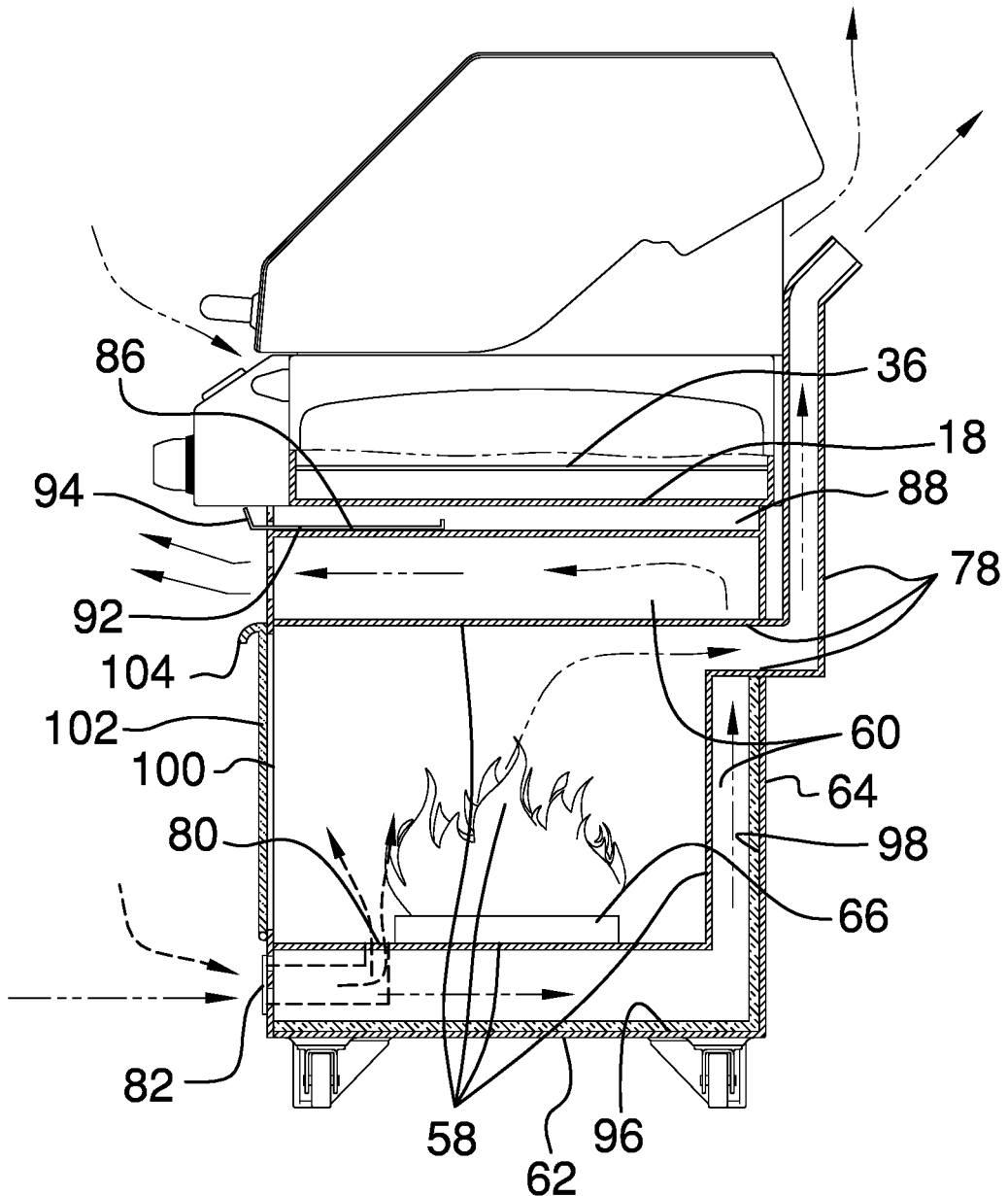
FIG. 5 is a cross-sectional view of an embodiment of the disclosure.

Each of a plurality of front slots 50 is positioned in the control panel 38, as shown in FIG. 3, and extends through the forward face 40 of the grill box 20. A plurality of rear slots 52 is positioned in a rearward face 54 of the grill box 20, as shown in FIG. 3, so that the front slots 50 and the rear slots 52 are configured to vent the grill box 20.

A fireplace 56, which also is fuel gas powered, is coupled to the housing 12 and is positioned in the interior space 14. Fuel gas that flows to the fireplace 56 is configured to be lit by the user to heat an area proximate to the fireplace 56.

The fireplace 56 comprises a fire box 58 that is coupled to the housing 12 and is positioned in the interior space 14 so that the fire box 58 defines a chamber 60. The chamber 60 extends between the fire box 58 and the top 18 of the housing 12, between the fire box 58 and a bottom 62 of the housing 12, and between the fire box 58 and a back 64 of the housing 12.

A gas burner 66 is coupled to and positioned in the fire box 58. The gas burner 66 is selectively couplable to the source of fuel gas. A gas burner knob 68, which is coupled to the control panel 38, is operationally coupled to the gas burner 66 and the source of fuel gas. The gas burner knob 68 is configured to be selectively turned to control a flow of fuel gas to the gas burner 66. The gas burner knob 68 is differentially colored relative to the plurality of burner knobs 42. Additional items, such as fake logs 70, as shown in FIG. 2, glass pebbles, and the like, may be positioned on the gas burner 66 to enhance visual appeal and interest.

Figure 2:
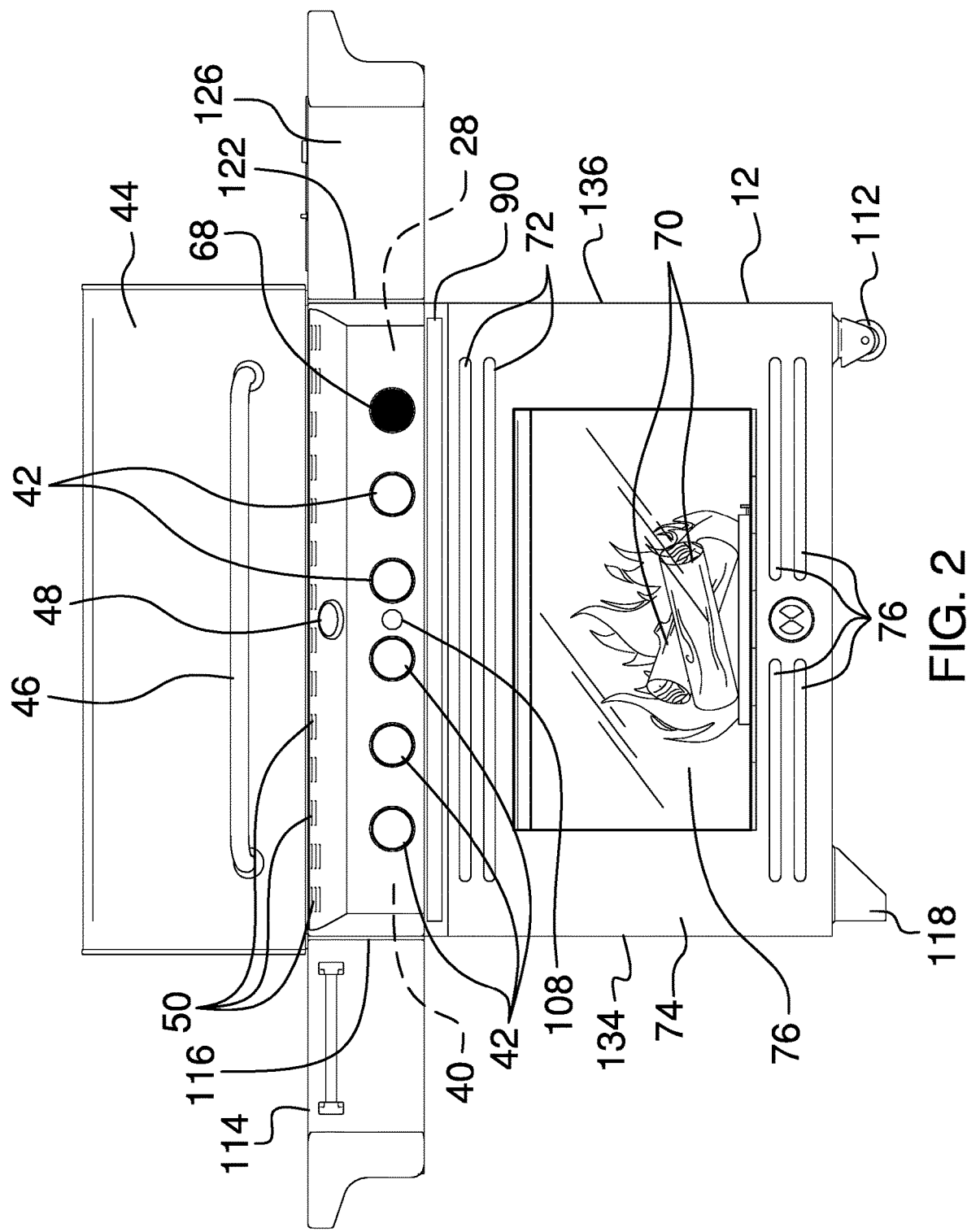
FIG. 2 is a front view of an embodiment of the disclosure.

As shown in FIG. 2, a plurality of upper slots 72 is positioned in a front 74 proximate to the top 18 of the housing 12 so that the upper slots 72 are in fluidic communication with the chamber 60. A plurality of lower slots 76 is positioned in the front 74 proximate to the bottom 62 of the housing 12 so that the lower slots 76 are in fluidic communication with the chamber 60. The lower slots 76 are configured to allow air to enter the chamber 60 so that the air is warmed by contacting the fire box 58 as the air passes through the chamber 60 to exit the upper slots 72 to heat the area proximate to the fireplace 56.

A rear pipe 78 is coupled to the fire box 58 and extends through the chamber 60 and the back 64 of the housing 12 so that the rear pipe 78 is positioned to vent exhaust from the fire box 58. The rear pipe 78 exits the housing 12 and extends first upwardly along the barbecue 16 and then transversely from the barbecue 16 so that the exhaust is directed away from the housing 12 and the barbecue 16.

An aperture 80 that is positioned in the fire box 58 faces the bottom 62 of the housing 12 so that the aperture 80 is configured to admit air into the fire box 58. A hole 82 is positioned in the front 74 proximate to the bottom 62 of the housing 12. A front pipe 84 is coupled to extends between the front 74 and the fire box 58 so that the front pipe 84 terminates at the hole 82 and the aperture 80. The front pipe 84 is configured to feed air to the fire box 58 and to separate the air that passes through the front pipe 84 from the air that passes through the chamber 60.

A wall 86 is coupled to the housing 12 and is positioned in the chamber 60 proximate to, and in parallel with, the top 18 to define a compartment 88. A cutout 90 is positioned in the housing 12 between the upper slots 72 and the top 18. A plate 92 is positioned in the compartment 88 and is slidably coupled to at least one of the housing 12 and the wall 86. A rim 94 is coupled to and extends transversely and upwardly from the plate 92 so that the rim 94 is positioned proximate to the cutout 90. The rim 94 is configured to be grasped in digits of the hand of the user, positioning the user to slidably extend the plate 92 from the compartment 88 through the cutout 90 so that the plate 92 is positioned below the control panel 38. The plate 92 is configured to deflect hot air that exits the upper slots 72 away from the control panel 38.

A first panel 96 is positioned in the chamber 60 and is coupled to the bottom 62 of the housing 12. A second panel 98 is positioned in the chamber 60 and is coupled to the back 64 of the housing 12. The second panel 98 and the first panel 96 are insulating. The second panel 98 and the first panel 96 are configured to minimize loss of heat from the fire box 58 through the back 64 and the bottom 62 of the housing 12, respectively.

An opening 100, which is rectangularly shaped, is positioned in the front 74 of the housing 12. A window 102 is coupled to the front 74 of housing 12 so that the window 102 substantially sealably closes the opening 100. The window 102 is configured to allow visual enjoyment of the fireplace 56.

A lip 104 is coupled to and extends transversely from the window 102. The window 102 is hingedly coupled to the housing 12. The lip 104 is configured to be grasped in the digits of the hand of the user to pivot the window 102 relative to the housing 12 to allow access to the interior space 14 through the opening 100. The window 102 is hingedly coupled to the housing 12 proximate to a lower edge 106 of the opening 100 so that the window 102 opens downwardly.

A starter 108, which is piezoelectric type, is coupled to the control panel 38. The starter 108 is operationally coupled to the barbecue 16 and the fireplace 56 so that the starter 108 is configured to ignite the barbecue 16 and to light the fireplace 56.

A tube 110 is coupled to and extends from the housing 12. The tube 110 is operationally coupled to the plurality of barbecue burners 36 and the gas burner 66. The tube 110 is configured to couple to the source of fuel gas to supply the fuel gas to the plurality of barbecue burners 36 and the gas burner 66.

A plurality of rollers 112 is coupled to the bottom 62 of the housing 12. The rollers 112 are configured for a user to locomote the housing 12 along a substantially horizontal surface. The plurality of rollers 112 comprises two rollers 112.

A first side table 114 is coupled to and extends from a first side 116 of the barbecue 12. The first side table 114 is configured to position an article. Each of a pair of feet 118 is coupled proximate to a respective corner 120 of the bottom 62 and a first side face 134 of the housing 12. Each roller 112 is coupled proximate to a respective corner 120 of the bottom 62 and a second side face 136 of the housing 12. The first side table 114 is configured to be grasped in the hand of the user to lift the housing 12 so that the pair of feet 118 are elevated from the substantially horizontal surface, positioning the user to locomote the housing 12 upon the rollers 112 along the substantially horizontal surface.

A side handle 124 that is coupled to the first side table 114 is configured to be grasped in the hand of the user to lift the housing 12 so that the pair of feet 118 are elevated from the substantially horizontal surface, positioning the user to locomote the housing 12 upon the rollers 112 along the substantially horizontal surface.

A second side table 126 is coupled to and extends from the second side 122 of the barbecue 16 proximate to the top 18. The second side table 126 is configured to position an article. A side burner 128 is coupled to the second side table 126. The side burner 128 is selectively couplable to the source of fuel gas so that the side burner 128 is configured to heat an item of cookware and contents thereof.

A control knob 130 that is coupled to the second side table 126 is operationally coupled to the side burner 128 and the source of fuel gas. The control knob 130 is configured to be selectively turned to control a flow of fuel gas to the side burner 128. An igniter 132, which is piezoelectric type, is coupled to the second side table 126. The igniter 132 is operationally coupled to the side burner 128 and is configured to ignite fuel gas that flows to the side burner 128.

The present invention anticipates the fireplace 56 being equipped with a first pilot light assembly. The present invention also anticipates the barbecue 16 being equipped with a second pilot light assembly.

In use, the barbecue 16 is ignited by a user to barbecue a food item. The fireplace 56 is lit by the user to heat the area proximate to the fireplace 56, while the window 102 allows visual enjoyment of the fireplace 56. As needed, the side burner 128 is used to heat the item of cookware and the contents thereof.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A barbecue and fireplace combination assembly comprising:
   a housing defining an interior space;
   a barbecue mounted to a top of the housing, the barbecue being fuel gas powered wherein fuel gas flowing to the barbecue is configured for being ignited by a user for barbecuing a food item;
   a fireplace coupled to the housing and positioned in the interior space, the fireplace being fuel gas powered wherein fuel gas flowing to the fireplace is configured for being lighted by the user for heating an area proximate to the fireplace;
   an opening positioned in a front of the housing;
   a window coupled to the front of housing such that the window substantially sealably closes the opening wherein the window is configured for visual enjoyment of the fireplace; and
   a lip coupled to and extending transversely from the window, the window being hingedly coupled to the housing wherein the lip is configured for grasping in the digits of the hand of the user for pivoting the window relative to the housing for accessing the interior space through the opening.

2. The assembly of claim 1, further including the barbecue comprising:
   a grill box having an upper surface, the upper surface being open;
   a plurality of barbecue burners coupled to and positioned in the grill box, the plurality of barbecue burners being selectively couplable to a source of fuel gas;
   a control panel coupled to and extending from a forward face of the grill box, the control panel comprising a plurality of burner knobs, each burner knob being operationally coupled to a respective barbecue burner and the source of fuel gas wherein the burner knob is configured for being selectively turned for controlling a flow of fuel gas to the respective barbecue burner;
   a lid pivotally coupled to the grill box wherein the lid is positioned for selectively closing the grill box; and
   a lid handle coupled to the lid wherein the lid handle is configured for grasping in a hand of the user for pivoting the lid relative to the grill box for opening the grill box.

3. The assembly of claim 2, further including the grill box comprising:
   a pair of side panels, each side panel being coupled to and extending perpendicularly from a respective opposing edge of the top;
   a back panel coupled to and extending from a back edge of the top, the back panel being coupled to and extending between the side panels; and
   a front panel coupled to and extending from a front edge of the top, the front panel being coupled to and extending between the side panels, the front panel being dimensionally shorter than the back panel such that the side panels taper from the back panel to the front panel.

4. The assembly of claim 2, further including a thermometer coupled to the control panel wherein the thermometer is configured for measuring a temperature within the grill box and displaying a temperature reading to the user.

5. A barbecue and fireplace combination assembly comprising:
   a housing defining an interior space;
   a barbecue mounted to a top of the housing, the barbecue being fuel gas powered wherein fuel gas flowing to the barbecue is configured for being ignited by a user for barbecuing a food item, the barbecue comprising
      a grill box having an upper surface, the upper surface being open,
      a plurality of barbecue burners coupled to and positioned in the grill box, the plurality of barbecue burners being selectively couplable to a source of fuel gas,
      a control panel coupled to and extending from a forward face of the grill box, the control panel comprising a plurality of burner knobs, each burner knob being operationally coupled to a respective barbecue burner and the source of fuel gas wherein the burner knob is configured for being selectively turned for controlling a flow of fuel gas to the respective barbecue burner,
      a lid pivotally coupled to the grill box wherein the lid is positioned for selectively closing the grill box, and
      a lid handle coupled to the lid wherein the lid handle is configured for grasping in a hand of the user for pivoting the lid relative to the grill box for opening the grill box;
   a fireplace coupled to the housing and positioned in the interior space, the fireplace being fuel gas powered wherein fuel gas flowing to the fireplace is configured for being lighted by the user for heating an area proximate to the fireplace;

an opening positioned in a front of the housing;
a window coupled to the front of housing such that the window substantially sealably closes the opening wherein the window is configured for visual enjoyment of the fireplace; and
the fireplace comprising:
  a fire box coupled to the housing and positioned in the interior space such that the fire box defines a chamber, the chamber extending between the fire box and the top of the housing, between the fire box and a bottom of the housing, and between the fire box and a back of the housing;
  a gas burner coupled to and positioned in the fire box, the gas burner being selectively couplable to the source of fuel gas;
  a gas burner knob coupled to the control panel, the gas burner knob being operationally coupled to the gas burner and the source of fuel gas wherein the gas burner knob is configured for being selectively turned for controlling a flow of fuel gas to the gas burner, the gas burner knob being differentially colored relative to the plurality of burner knobs;
  a tube coupled to and extending from the housing, the tube being operationally coupled to the plurality of barbecue burners and the gas burner wherein the tube is configured for coupling to the source of fuel gas for suppling the fuel gas to the plurality of barbecue burners and the gas burner;
  a plurality of upper slots positioned in the front proximate to the top of the housing such that the upper slots are in fluidic communication with the chamber;
  a plurality of lower slots positioned in the front proximate to the bottom of the housing such that the lower slots are in fluidic communication with the chamber wherein the lower slots are configured for air entering the chamber such that the air is warmed by contacting the fire box as the air passes through the chamber to exit the upper slots for heating the area proximate to the fireplace;
  a rear pipe coupled to the fire box and extending through the chamber and the back of the housing such that the rear pipe is positioned for venting exhaust from the fire box; and
  an aperture positioned in the fire box such that the aperture faces the bottom of the housing wherein the aperture is configured for admitting air into the fire box.

6. The assembly of claim 5, further including the rear pipe exiting the housing and extending first upwardly along the barbecue and then transversely from the barbecue such that the exhaust is directed away from the housing and the barbecue.

7. The assembly of claim 5, further comprising:
a hole positioned in the front proximate to the bottom of the housing; and
a front pipe coupled to extending between the front and the fire box such that the front pipe terminates at the hole and the aperture wherein the front pipe is configured for feeding air to the fire box and such that the air passing through the front pipe is separated from the air passing through the chamber.

8. The assembly of claim 5, further comprising:
a wall coupled to the housing and positioned in the chamber proximate to and in parallel with the top defining a compartment;
a cutout positioned in the housing between the upper slots and the top;
a plate positioned in the compartment and slidably coupled to at least one of the housing and the wall; and
a rim coupled to and extending transversely and upwardly from the plate such that the rim is positioned proximate to the cutout wherein the rim is configured for grasping in digits of the hand of the user positioning the user for slidably extending the plate from the compartment through the cutout such that the plate is positioned below the control panel wherein the plate is configured for deflecting hot air exiting the upper slots away from the control panel.

9. The assembly of claim 5, further comprising:
a first panel positioned in the chamber and coupled to the bottom of the housing; and
a second panel positioned in the chamber and coupled to the back of the housing, the second panel and the first panel being insulating wherein the second panel and the first panel are configured for minimizing loss of heat from the fire box through the back and the bottom of the housing, respectively.

10. The assembly of claim 1, further including the opening being rectangularly shaped.

11. The assembly of claim 1, further including the window being hingedly coupled proximate to a lower edge of the opening such that the window opens downwardly.

12. The assembly of claim 5, further including a starter coupled to the control panel, the starter being piezoelectric type, the starter being operationally coupled to the barbecue and the fireplace wherein the starter is configured for igniting the barbecue and lighting the fireplace.

13. The assembly of claim 1, further including a plurality of rollers coupled to a bottom of the housing wherein the rollers are configured for locomoting the housing along a substantially horizontal surface.

14. The assembly of claim 13, further comprising:
a first side table coupled to and extending from a first side of the barbecue wherein the first side table is configured for positioning an article; and
a pair of feet, each foot being coupled proximate to a respective corner of the bottom and the first side face of the housing, the plurality of rollers comprising two rollers, each roller being coupled proximate to a respective corner of the bottom and a second side face of the housing wherein the first side table is configured for grasping in a hand of the user for lifting the housing such that the pair of feet are elevated from the substantially horizontal surface positioning the user for locomoting the housing upon the rollers along the substantially horizontal surface.

15. The assembly of claim 14, further including a side handle coupled to the first side table wherein the side handle is configured for grasping in the hand of the user for lifting the housing such that the pair of feet are elevated from the substantially horizontal surface positioning the user for locomoting the housing upon the rollers along the substantially horizontal surface.

16. The assembly of claim 14, further comprising:
a second side table coupled to and extending from a second side of the barbecue wherein the second side table is configured for positioning an article;
a side burner coupled to the second side table, the side burner being selectively couplable to the source of fuel gas wherein the side burner is configured for heating an item of cookware and contents thereof;
a control knob coupled to the second side table, the control knob being operationally coupled to the side burner and the source of fuel gas wherein the control knob is configured for being selectively turned for controlling a flow of fuel gas to the side burner; and
an igniter coupled to the second side table, the igniter being piezoelectric type, the igniter being operationally coupled to the side burner wherein the igniter is configured for igniting fuel gas flowing to the side burner.

17. A barbecue and fireplace combination assembly comprising:
a housing defining an interior space;
a barbecue mounted to a top of the housing, the barbecue being fuel gas powered wherein fuel gas flowing to the barbecue is configured for being ignited by a user for barbecuing a food item, the barbecue comprising
a grill box having an upper surface, the upper surface being open, the grill box comprising:
a pair of side panels, each side panel being coupled to and extending perpendicularly from a respective opposing edge of the top;
a back panel coupled to and extending from a back edge of the top, the back panel being coupled to and extending between the side panels; and
a front panel coupled to and extending from a front edge of the top, the front panel being coupled to and extending between the side panels, the front panel being dimensionally shorter than the back panel such that the side panels taper from the back panel to the front panel,
a plurality of barbecue burners coupled to and positioned in the grill box, the plurality of barbecue burners being selectively couplable to a source of fuel gas,
a control panel coupled to and extending from a forward face of the grill box, the control panel comprising a plurality of burner knobs, each burner knob being operationally coupled to a respective barbecue burner and the source of fuel gas wherein the burner knob is configured for being selectively turned for controlling a flow of fuel gas to the respective barbecue burner,
a lid pivotally coupled to the grill box wherein the lid is positioned for selectively closing the grill box, and
a lid handle coupled to the lid wherein the lid handle is configured for grasping in a hand of the user for pivoting the lid relative to the grill box for opening the grill box;
a fireplace coupled to the housing and positioned in the interior space, the fireplace being fuel gas powered wherein fuel gas flowing to the fireplace is configured for being lighted by the user for heating an area proximate to the fireplace;
an opening positioned in a front of the housing;
a window coupled to the front of housing such that the window substantially sealably closes the opening wherein the window is configured for visual enjoyment of the fireplace;
a plurality of front slots positioned in the control panel, each front slot extending through the forward face of the grill box; and
a plurality of rear slots positioned in a rearward face of the grill box wherein the front slots and the rear slots are configured for venting the grill box.

18. The assembly of claim 1, further comprising:
the barbecue comprising:
a grill box having an upper surface, the upper surface being open, the grill box comprising:
a pair of side panels, each side panel being coupled to and extending perpendicularly from a respective opposing edge of the top,
a back panel coupled to and extending from a back edge of the top, the back panel being coupled to and extending between the side panels,
a front panel coupled to and extending from a front edge of the top, the front panel being coupled to and extending between the side panels, the front panel being dimensionally shorter than the back panel such that the side panels taper from the back panel to the front panel,
a plurality of barbecue burners coupled to and positioned in the grill box, the plurality of barbecue burners being selectively couplable to a source of fuel gas,
a control panel coupled to and extending from a forward face of the grill box, the control panel comprising a plurality of burner knobs, each burner knob being operationally coupled to a respective barbecue burner and the source of fuel gas wherein the burner knob is configured for being selectively turned for controlling a flow of fuel gas to the respective barbecue burner,
a lid pivotally coupled to the grill box wherein the lid is positioned for selectively closing the grill box,
a lid handle coupled to the lid wherein the lid handle is configured for grasping in a hand of the user for pivoting the lid relative to the grill box for opening the grill box, and
a plurality of front slots positioned in the control panel, each front slot extending through the forward face of the grill box,
a plurality of rear slots positioned in a rearward face of the grill box wherein the front slots and the rear slots are configured for venting the grill box,
a thermometer coupled to the control panel wherein the thermometer is configured for measuring a temperature within the grill box and displaying a temperature reading to the user;
the fireplace comprising:
a fire box coupled to the housing and positioned in the interior space such that the fire box defines a chamber, the chamber extending between the fire box and the top of the housing, between the fire box and a bottom of the housing, and between the fire box and a back of the housing,
a gas burner coupled to and positioned in the fire box, the gas burner being selectively couplable to the source of fuel gas,
a gas burner knob coupled to the control panel, the gas burner knob being operationally coupled to the gas burner and the source of fuel gas wherein the gas burner knob is configured for being selectively turned for controlling a flow of fuel gas to the gas burner, the gas burner knob being differentially colored relative to the plurality of burner knobs,
a plurality of upper slots positioned in the front proximate to the top of the housing such that the upper slots are in fluidic communication with the chamber,
a plurality of lower slots positioned in the front proximate to the bottom of the housing such that the lower slots are in fluidic communication with the chamber wherein the lower slots are configured for air entering the chamber such that the air is warmed by contacting the fire box as the air passes through the chamber to exit the upper slots for heating the area proximate to the fireplace, a rear pipe coupled to the fire box and extending through the chamber and the back of the housing such that the rear pipe is positioned for venting exhaust from the fire box, the rear pipe exiting the housing and extending first upwardly along the barbecue and then transversely from the barbecue such that the exhaust is directed away from the housing and the barbecue, an aperture positioned in the fire box such that the aperture faces the bottom of the housing wherein the aperture is configured for admitting air into the fire box, a hole positioned in the front proximate to the bottom of the housing, and a front pipe coupled to extending between the front and the fire box such that the front pipe terminates at the hole and the aperture wherein the front pipe is configured for feeding air to the fire box and such that the air passing through the front pipe is separated from the air passing through the chamber;

a wall coupled to the housing and positioned in the chamber proximate to and in parallel with the top defining a compartment;

a cutout positioned in the housing between the upper slots and the top;

a plate positioned in the compartment and slidably coupled to at least one of the housing and the wall;

a rim coupled to and extending transversely and upwardly from the plate such that the rim is positioned proximate to the cutout wherein the rim is configured for grasping in digits of the hand of the user positioning the user for slidably extending the plate from the compartment through the cutout such that the plate is positioned below the control panel wherein the plate is configured for deflecting hot air exiting the upper slots away from the control panel;

a first panel positioned in the chamber and coupled to the bottom of the housing;

a second panel positioned in the chamber and coupled to the back of the housing, the second panel and the first panel being insulating wherein the second panel and the first panel are configured for minimizing loss of heat from the fire box through the back and the bottom of the housing, respectively;

the opening being rectangularly shaped;

the window being hingedly coupled proximate to a lower edge of the opening such that the window opens downwardly;

a starter coupled to the control panel, the start being piezoelectric type, the starter being operationally coupled to the barbecue and the fireplace wherein the starter is configured for igniting the barbecue and lighting the fireplace;

a tube coupled to and extending from the housing, the tube being operationally coupled to the plurality of barbecue burners and the gas burner wherein the tube is configured for coupling to the source of fuel gas for suppling the fuel gas to the plurality of barbecue burners and the gas burner;

a plurality of rollers coupled to the bottom of the housing wherein the rollers are configured for locomoting the housing along a substantially horizontal surface;

a first side table coupled to and extending from a first side of the barbecue wherein the first side table is configured for positioning an article;

a side handle coupled to the first side table wherein the side handle is configured for grasping in the hand of the user for lifting the housing such that the pair of feet are elevated from the substantially horizontal surface positioning the user for locomoting the housing upon the rollers along the substantially horizontal surface;

a pair of feet, each foot being coupled proximate to a respective corner of the bottom and the first side face of the housing, the plurality of rollers comprising two rollers, each roller being coupled proximate to a respective corner of the bottom and a second side face of the housing wherein the first side table is configured for grasping in the hand of the user for lifting the housing such that the pair of feet are elevated from the substantially horizontal surface positioning the user for locomoting the housing upon the rollers along the substantially horizontal surface;

a second side table coupled to and extending from a second side of the barbecue wherein the second side table is configured for positioning an article;

a side burner coupled to the second side table, the side burner being selectively couplable to the source of fuel gas wherein the side burner is configured for heating an item of cookware and contents thereof;

a control knob coupled to the second side table, the control knob being operationally coupled to the side burner and the source of fuel gas wherein the control knob is configured for being selectively turned for controlling a flow of fuel gas to the side burner; and an igniter coupled to the second side table, the igniter being piezoelectric type, the igniter being operationally coupled to the side burner wherein the igniter is configured for igniting fuel gas flowing to the side burner.

* * * * *